United States Patent
Bai et al.

(10) Patent No.: US 12,112,746 B2
(45) Date of Patent: Oct. 8, 2024

(54) METHOD AND DEVICE FOR PROCESSING VOICE INTERACTION, ELECTRONIC DEVICE AND STORAGE MEDIUM

(71) Applicant: Beijing Baidu Netcom Science Technology Co., Ltd., Beijing (CN)

(72) Inventors: Jinfeng Bai, Beijing (CN); Zhijian Wang, Beijing (CN); Cong Gao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 311 days.

(21) Appl. No.: 17/476,333

(22) Filed: Sep. 15, 2021

(65) Prior Publication Data

US 2022/0005474 A1 Jan. 6, 2022

(30) Foreign Application Priority Data

Nov. 10, 2020 (CN) .......................... 202011246776.3

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
None
See application file for complete search history.

(56) References Cited

U.S. PATENT DOCUMENTS

| 10,885,898 B2 | 1/2021 | Petar et al. |
| 2017/0069309 A1* | 3/2017 | Aleksic ................... G10L 15/22 |
| 2018/0012591 A1 | 1/2018 | Petar et al. |
| 2018/0130462 A1* | 5/2018 | Kayama ................... G10L 13/00 |

(Continued)

FOREIGN PATENT DOCUMENTS

| CN | 109473104 A | 3/2019 |
| CN | 109961787 A | 7/2019 |

(Continued)

OTHER PUBLICATIONS

Office Action issued in Japanese Patent Application No. 2021-134212, Aug. 16, 2022, with English translation (6 pages).

(Continued)

*Primary Examiner* — Nafiz E Hoque
(74) *Attorney, Agent, or Firm* — HSML P.C.

(57) ABSTRACT

The present disclosure provides a method and a device for processing voice interaction, an electronic device and a storage medium. The method includes: determining a first integrity of a voice instruction from a user by using a pre-trained integrity detection model in response to detecting that the voice instruction from the user is not a high-frequency instruction; determining a waiting duration for the voice instruction based on the first integrity and a preset integrity threshold, wherein the waiting duration for the voice instruction indicates a length of period between a time when a voice interaction device determines that receiving the voice instruction is completed and a time when the voice interaction device performs an operation in response to the voice instruction of the user; and controlling the voice interaction device to respond to the voice instruction of the user based on the waiting duration.

16 Claims, 10 Drawing Sheets

(56) References Cited

U.S. PATENT DOCUMENTS

| | | | |
|---|---|---|---|
| 2018/0366120 A1* | 12/2018 | Ushio | ................... G10L 15/063 |
| 2019/0139566 A1 | 5/2019 | Qian | |
| 2019/0378493 A1* | 12/2019 | Kim | ....................... G10L 15/25 |
| 2021/0090554 A1 | 3/2021 | Petar et al. | |

FOREIGN PATENT DOCUMENTS

| | | |
|---|---|---|
| CN | 110199350 A | 9/2019 |
| CN | 111292729 A | 6/2020 |
| CN | 111627423 A | 9/2020 |
| JP | 2003-255972 A | 9/2003 |
| JP | 2005-17932 A | 1/2005 |
| JP | 2018-504623 A | 2/2018 |
| TW | 201937480 A | 9/2019 |

OTHER PUBLICATIONS

First Office Action issued for Chinese Patent Application No. 202011246776.3, dated Apr. 20, 2023, 23 pages including English machine translation.

Office Action issued for Korean Patent Application No. 10-2021-0082557, Dispatched date: Apr. 29, 2024, 7 pages including English machine translation.

* cited by examiner

METHOD AND DEVICE FOR PROCESSING VOICE INTERACTION, ELECTRONIC DEVICE AND STORAGE MEDIUM

CROSS REFERENCE TO RELATED APPLICATION(S)

This application claims the priority of the Chinese patent application 202011246776.3 filed on Nov. 10, 2020, the content of which is hereby used for reference.

TECHNICAL FIELD

The present disclosure relates to a field of computer technology, in particular to a field of artificial intelligence technology such as intelligent voice processing and deep learning, and in particular to a method and a device for processing voice interaction, an electronic device and a storage medium.

BACKGROUND

At present, most of products for voice interaction are based on a manner of waking up once and interacting once. An interaction manner combines a wake-up word detection technology and a product method. A main feature of the interaction manner is: if a voice interaction device received a wake-up word from a user and was activated, a wake-up word detection module built in the voice interaction device may detect the wake-up word, and then start recognition and listening. The voice interaction device may finish listening when an end of the voice is detected or a preset time is reached. Then the voice received during a listening process is recognized, and the user's needs are responded base on results of the voice recognition, so as to achieve a process of responding to the user's needs.

In the method described above, a few seconds to tens of seconds after receiving the wake-up word may be considered as the listening process, in which the user sends a voice instruction to the voice interaction device, and the voice interaction device that wakes up at this time responds to the user's needs based on the voice instruction.

SUMMARY

The present disclosure provides a method and a device for processing voice interaction, an electronic device and a storage medium.

According to an aspect of the present disclosure, a method for processing voice interaction is provided, and the method includes: determining a first integrity of a voice instruction from a user by using a pre-trained integrity detection model in response to detecting that the voice instruction from the user is not a high-frequency instruction; determining a waiting duration for the voice instruction based on the first integrity and a preset integrity threshold, wherein the waiting duration for the voice instruction indicates a length of period between a time when a voice interaction device determines that receiving the voice instruction is completed and a time when the voice interaction device performs an operation in response to the voice instruction of the user; and controlling the voice interaction device to respond to the voice instruction of the user based on the waiting duration.

According to another aspect of the present disclosure, a method for processing voice interaction is provided, and the method includes: receiving a voice instruction from a user; uploading the voice instruction of the user to a cloud server; receiving a control command generated by the cloud server for the voice instruction from the user, in which the control command includes a waiting duration determined by the cloud server, and the waiting duration indicates a length of period between a time when a voice interaction device determines that receiving the voice instruction is completed and a time when the voice interaction device performs an operation in response to the voice instruction from the user; and responding to the voice instruction according to the waiting duration in the control command.

According to another aspect of the present disclosure, a cloud server is provided, and the cloud server includes: a determination module configured to determine a first integrity of a voice instruction from a user by using a pre-trained integrity detection model in response to detecting that the voice instruction of the user is not a high-frequency instruction; a configuration module configured to determine a waiting duration for the voice instruction based on the first integrity and a preset integrity threshold, in which the waiting duration for the voice instruction indicates a length of period between a time when a voice interaction device determines that receiving the voice instruction is completed and a time when the voice interaction device performs an operation in response to the voice instruction of the user; and a control module configured to control the voice interaction device to respond to the voice instruction of the user based on the waiting duration.

According to yet another aspect of the present disclosure, a voice interaction device is provided, and the voice interaction device includes: a receiving module configured to receive a voice instruction from a user; an upload module configured to upload the voice instruction of the user to a cloud server, in which the receiving module is further configured to receive a control command generated by the cloud server for the voice instruction of the user, and the control command includes a waiting duration determined by the cloud server, and waiting duration indicates a length of period between a time when the voice interaction device determines that receiving the voice instruction is completed and a time when the voice interaction device performs an operation in response to the voice instruction from the user; and a response module configured to respond to the voice instruction according to the waiting duration in the control command.

According to yet another aspect of the present disclosure, a voice interaction system is provided, and the voice interaction system includes the voice interaction device as described above and the cloud server as described above, and the cloud server is in communication with the voice interaction device.

According to yet another aspect of the present disclosure, an electronic device is provided, and the electronic device includes: at least one processor; and a memory in communication with the at least one processor; and the memory stores instructions executable by the at least one processor, and the instructions, when executed by the at least one processor, cause the at least one processor to perform the method described above.

According to yet another aspect of the present disclosure, an non-transitory computer-readable storage medium having computer instructions stored thereon is provided, and the computer instructions, when executed, cause a computer to perform the method described above.

It should be understood that the content described in this section is not intended to identify key or important features of the embodiments of the present disclosure, nor is it intended to limit the scope of the present disclosure. Other features of the present disclosure will become easily understood by the following description.

BRIEF DESCRIPTION OF THE DRAWINGS

The accompanying drawings are for a better understanding of the present disclosure and do not constitute a limitation of the present disclosure, in which.

DETAILED DESCRIPTION

The following describes the exemplary embodiments of the present disclosure in combination with the accompanying drawings, including various details of the embodiments of the present disclosure for the sake of understanding, which should be considered as only exemplary. Therefore, those skilled in the art should recognize that various changes and modifications may be made to the embodiments described herein without departing from the scope and spirit of the present disclosure. Similarly, for the sake of clarity and conciseness, the description of well-known functions and structures is omitted in the following description.

Figure 1:
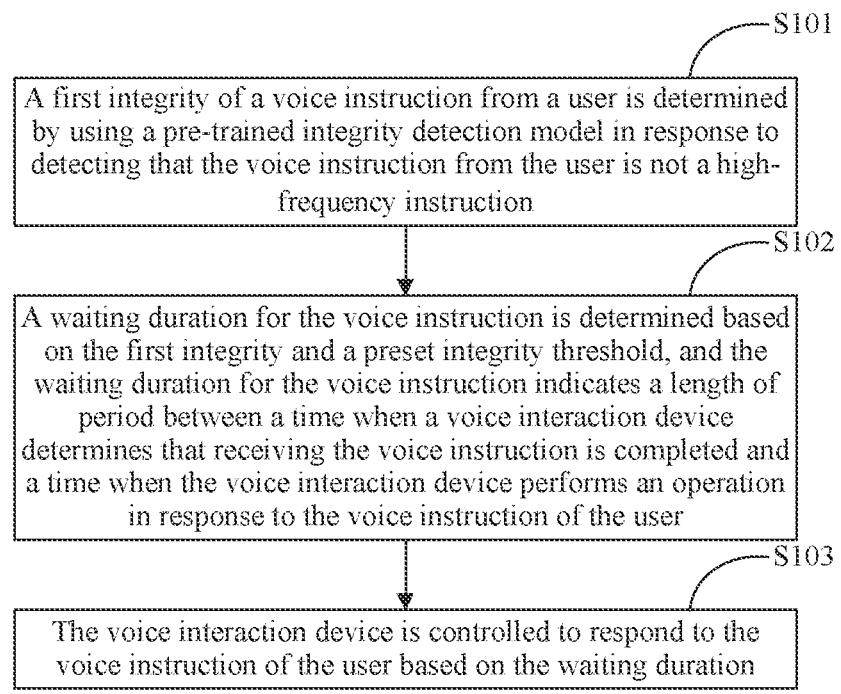
FIG. 1 shows a schematic diagram according to a first embodiment of the present disclosure.

FIG. 1 shows a schematic diagram according to a first embodiment of the present disclosure. As shown in FIG. 1, the embodiment provides a method for processing voice interaction, and the method may specifically include the following steps.

In S101, a first integrity of a voice instruction from a user is determined by using a pre-trained integrity detection model, in response to detecting that the voice instruction from the user is not a high-frequency instruction.

In S102, a waiting duration for the voice instruction is determined based on the first integrity and a preset integrity threshold, and the waiting duration for the voice instruction indicates a length of period between a time when a voice interaction device determines that receiving the voice instruction is completed and a time when the voice interaction device performs an operation in response to the voice instruction of the user.

In S103, the voice interaction device is controlled to respond to the voice instruction of the user based on the waiting duration.

An executing entity of the method for processing voice interaction in this embodiment may be a cloud server, that is, this embodiment realizes the processing of voice interaction on the cloud server side. The voice interaction device side may implement the processing of voice interaction according to a conventional processing mode and cooperate with the cloud server.

Figure 2:
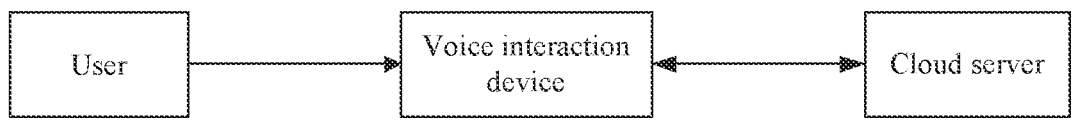
FIG. 2 shows an application scenario diagram of a method for processing voice interaction according to the embodiments of the present disclosure.
Figure 3A:
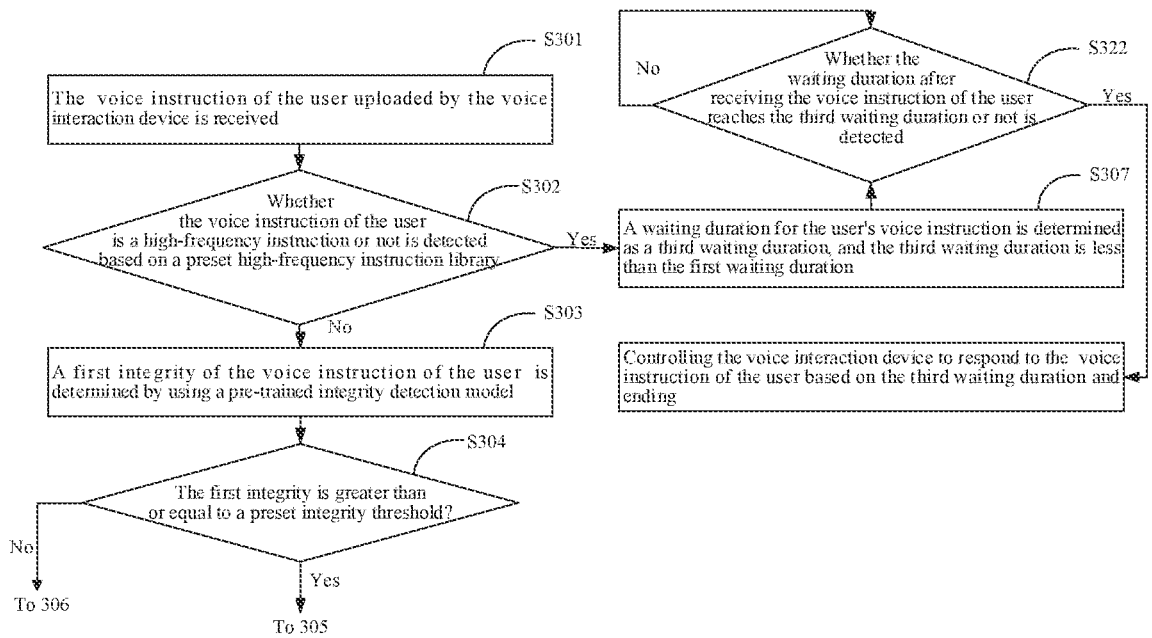
FIG. 3 A.
FIG. 3B, FIG. 3C, and FIG. 3D show a schematic diagram according to a second embodiment of the present disclosure.
Figure 3B:
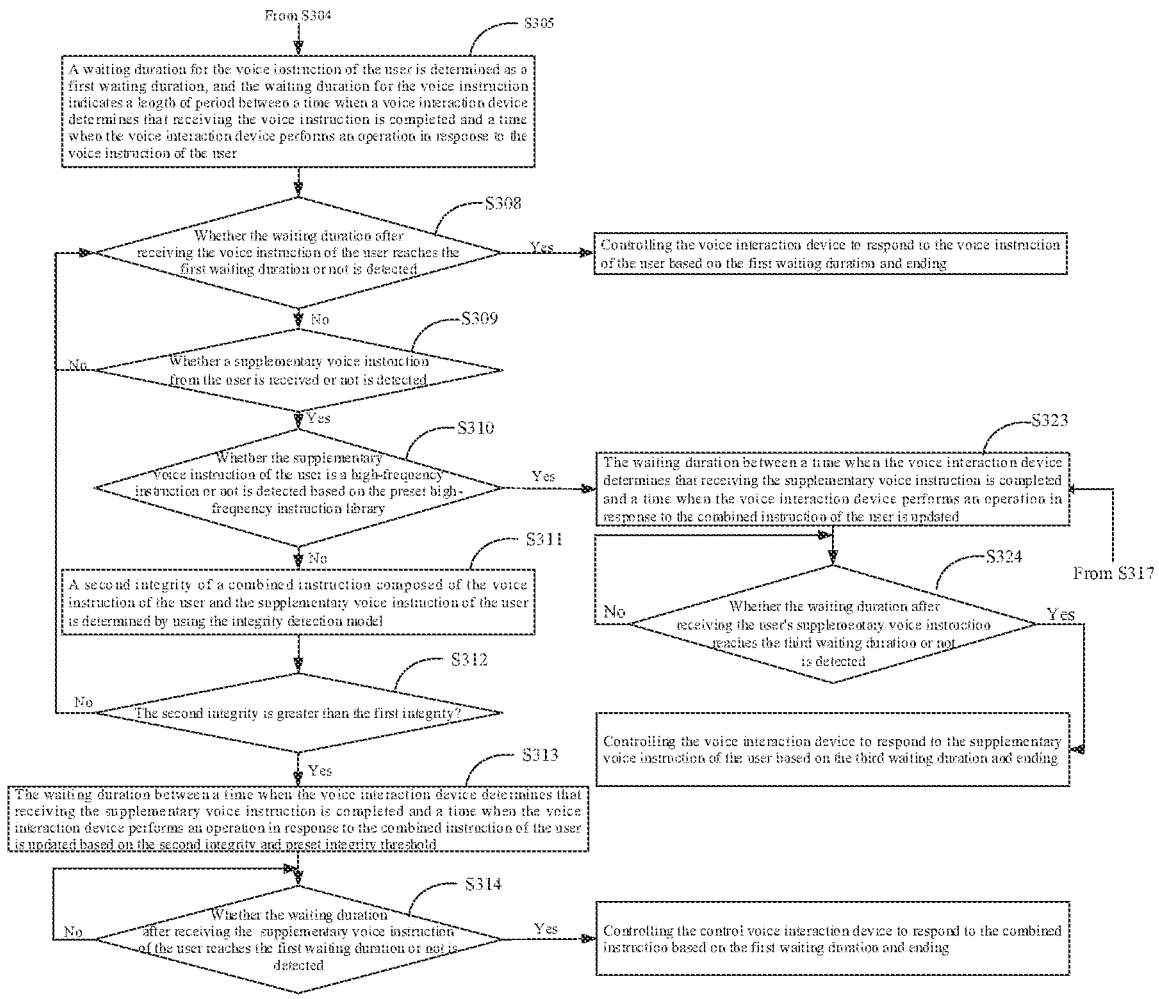
Figure 3C:
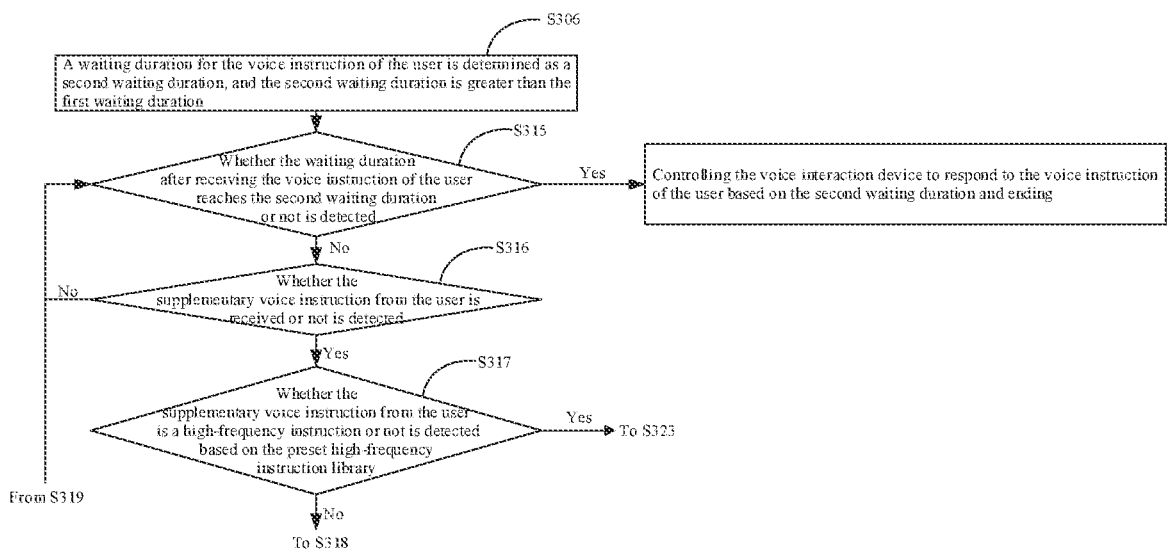
Figure 3D:
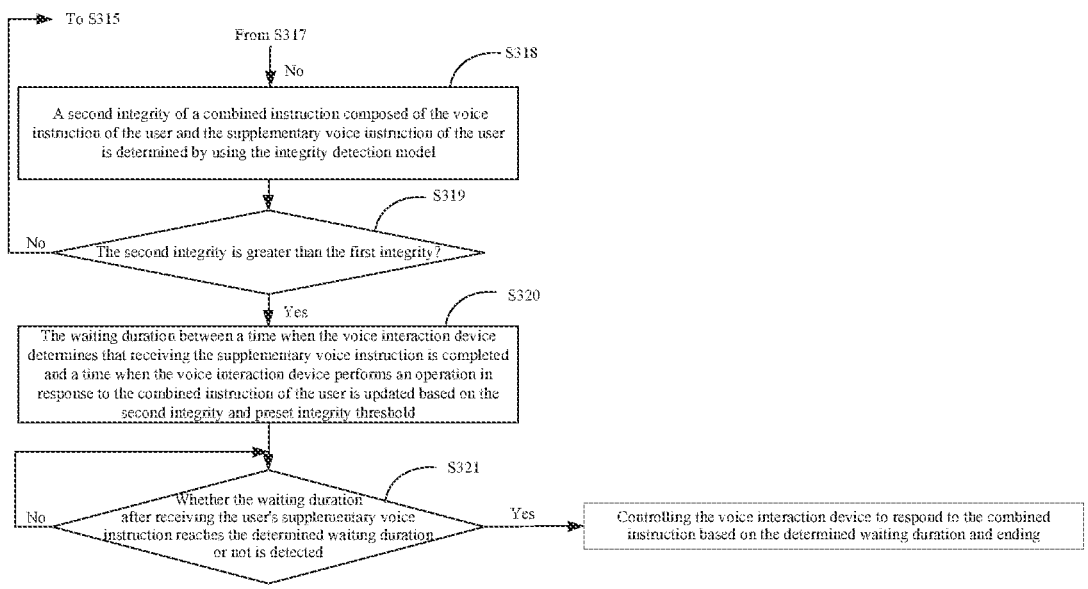

FIG. 2 shows an application scenario diagram of a method for processing voice interaction according to the embodiments of the present disclosure. As shown in FIG. 2, in the voice interaction, the user may send a voice containing a wake-up word and a voice instruction to the voice interaction device. The voice interaction device is awakened when the wake-up word is detected. The voice interaction device may monitor the voice instruction from the user when receiving the wake-up word, and upload the voice instruction to the cloud server. The cloud server processes the voice interaction based on the voice instruction received from the user.

The technical solution of this embodiment is applied to a voice interaction solution implemented based on the voice instruction from the user when the voice interaction device is awakened in response to detecting the wake-up word sent by the user.

Specifically, when the cloud server receives the voice instruction of the user transmitted by the voice interaction device, the cloud server first needs to detect whether the voice instruction of the user is a high-frequency instruction or not. For example, in this embodiment, a high-frequency instruction library may be set in advance, in which all high-frequency instructions are collected. A content of specific high-frequency instructions is related to the application scenario of the voice interaction device. If the voice interaction device is a smart speaker, the corresponding high-frequency instructions may include; start, pause, close, previous, next, louder, quieter, and so on. If the voice interaction device is a smart home device, the corresponding high-frequency instructions may include; turn on a light, turn off a light, turn on an air conditioner, turn off an air conditioner, a temperature up, a temperature down, and so on. If the voice interaction device is a smart vehicle device, the corresponding high-frequency instructions may include: open a window, close a window, play music, stop music, turn on a navigation, turn off a navigation, and so on.

In each scenario, the high-frequency instructions in the high-frequency instruction library may be voice instructions or text instructions obtained by voice recognition of the voice instructions. During a process of detecting, by the voice interaction device, whether the voice instruction of the user is a high-frequency instruction based on the high-frequency instruction library, if the high-frequency instruction is a voice instruction, the voice interaction device may directly compare the voice instruction of the user with each high-frequency instruction in the high-frequency instruction library, and if the voice instruction of the user is the same as a high-frequency instruction in the high-frequency instruction library, the voice instruction of the user may be determined as a high-frequency instruction. If the voice instruction of the user is different from all the high-frequency instructions in the high-frequency instruction library, the voice instruction of the user is determined as not being a high-frequency instruction. Similarly, if the high-frequency instruction in the high-frequency instruction library is in a form of text, a user instruction in the form of text may be obtained by the voice recognition of the voice instruction of the user, and then the user instruction in the form of text may be compared with each high-frequency instruction in the high-frequency instruction library to detect whether the user instruction in the form of text is a high-frequency instruction. The comparison principle is the same, which will not be repeated here.

If it is detected that the voice instruction of the user is not a high-frequency instruction, a first integrity of the voice instruction of the user may be determined by using a pre-trained integrity detection model in this embodiment. In a specific implementation, the voice instruction of the user or the voice instruction of the user in the form of text may be input into the integrity detection model. The integrity detection model may be used to determine a semantic integrity of the voice instruction of the user and obtain the first integrity. For example, the first integrity may be set to 0 to 1 as desired. The higher the value of the first integrity, the better the semantic integrity of the user's voice instruction, and the lower the value of the first integrity, the worse the semantic integrity of the user's voice instruction.

The integrity detection model of this embodiment may be a neural network model. Before training, a plurality of training samples may be collected in advance, and each training sample may include a voice instruction of a training user and an integrity of the voice instruction of the training user manually marked. For example, some voice instructions of training users with good integrity may be collected, and integrities of the voice instructions are marked as 1, and these voice instructions may be taken as positive training samples. At the same time, some voice instructions of training users with very poor integrity may also be collected, and integrities of the voice instructions are marked as 0, and these voice instructions may be taken as negative training samples. During the training, each training sample is input into the integrity detection model, and the integrity detection model may determine the integrity of the voice instruction of the training user based on the voice instructions of the training users in the input training samples.

Then the determined integrity of the voice instruction of the training user is compared with the marked integrity of the voice instruction of the training user. If the determined integrity of the voice instruction of the training user is inconsistent with the marked integrity of the voice instruction of the training user, then adjusting parameters of the integrity detection model, so as to make the determined integrity of the voice instruction of the training user close to the marked integrity of the voice instruction of the training user. A plurality of training samples are used to continuously train the integrity detection model in the above way until the determined integrity of the voice instruction of the training user is consistent with the marked integrity of the voice instruction of the training user in the continuous preset rounds of training. At this time, the training is completed, the parameters of the integrity detection model are determined, and then the integrity detection model is determined.

In this embodiment, when obtaining the first integrity of the voice instruction of the user, a waiting duration for the voice instruction may be determined based on the first integrity and a preset integrity threshold, and the waiting duration for the voice instruction indicates a length of period between a time when a voice interaction device determines that receiving the voice instruction is completed and a time when the voice interaction device performs an operation in response to the voice instruction of the user. It also means that in this embodiment, different waiting durations may be determined according to different relationships about a difference between the first integrity and the preset integrity threshold, and the voice interaction device may be controlled to respond to the voice instruction of the users based on the waiting duration. The present application is different from a related art. In the related art, if receiving the voice instruction of the user is completed, the voice interaction device may immediately respond, causing the user to be responded in a case that a user's short pause exists in the process of voice interaction, and resulting in a "scramble" phenomenon of the voice interaction device, and may not accurately perform an operation in response to the voice instruction of the user.

In the method for processing voice interaction according to the embodiments of the present disclosure, if it is detected that the voice instruction of the user is not a high-frequency instruction, the first integrity of the voice instruction of the user is determined by using the pre-trained integrity detection model. A waiting duration for the voice instruction is determined based on the first integrity and the preset integrity threshold, and the waiting duration for the voice instruction indicates a length of period between a time when the voice interaction device determines that receiving the voice instruction is completed and a time when the voice interaction device performs an operation in response to the voice instruction of the user. The voice interaction device is controlled to respond to the voice instruction of the user based on the waiting duration, instead of responding immediately at the end of the voice instruction of the user, so as to avoid the "scramble" phenomenon of the voice interaction device. It may determine the waiting duration of the operation responding to the voice instruction of the user, and control the voice interaction device to respond to the voice instruction of the user based on the waiting duration, which may effectively enhance the intelligence of voice interaction device.

FIG. 3A, FIG. 3B, FIG. 3C, and FIG. 3D show a schematic diagram according to a second embodiment of the present disclosure. As shown in FIG. 3A, FIG. 3B, FIG. 3C, and FIG. 3D, the method for processing voice interaction according to the embodiments of the present disclosure further provides a technical solution of the present disclosure in more detail on the basis of the technical solution of the embodiment shown in FIG. 1. As shown in FIG. 3A, FIG. 3B, FIG. 3C, and FIG. 3D, the method for processing voice interaction according to the embodiments of the present disclosure may specifically include the following steps.

In S301, the voice instruction of the user uploaded by the voice interaction device is received. On the voice interaction device side, the voice instruction of the user is a voice instruction sent by the user and monitored by the voice interaction device.

In S302, whether the voice instruction of the user is a high-frequency instruction or not is detected based on a preset high-frequency instruction library. If the voice instruction of the user is not a high-frequency instruction, executing step S303; and if the voice instruction of the user is a high-frequency instruction, executing step S307.

In S303, a first integrity of the voice instruction of the user is determined by using a pre-trained integrity detection model; and then executing step S304. The first integrity indicates an integrity of the voice instruction of the user.

In S304, whether the first integrity is greater than or equal to a preset integrity threshold or not is determined. If the first integrity is greater than or equal to the preset integrity threshold, then executing step S305; and if the first integrity is less than the preset integrity threshold, executing step S306. The preset integrity threshold of this embodiment may be set according to actual experience, and the specific value is not limited here.

In S305, a waiting duration for the voice instruction of the user is determined as a first waiting duration, and then executing step S308. The waiting duration for the voice instruction indicates a length of period between a time when a voice interaction device determines that receiving the voice instruction is completed and a time when the voice interaction device performs an operation in response to the voice instruction of the user. For example, the first waiting duration of this embodiment may be set to a reasonable time which is neither too long nor too short based on actual experience. For example, it may be set to 300 ms, 320 ms or other lengths of period, and there is no limitation here.

In S306, a waiting duration for the voice instruction of the user is determined as a second waiting duration, and the second waiting duration is greater than the first waiting duration; and executing step S315. Similarly, the second waiting duration of this embodiment may also be set based on actual experience. For example, it may be set to 800 ms, 7800 ms or other lengths of period, in short, the second waiting duration may be greater than the first waiting duration, and the specific duration is not limited here.

In this embodiment, different waiting durations are reasonably determined based on different relationships about size between the first integrity and the preset integrity threshold, so as to effectively enhance the intelligence of voice interaction.

In S307, a waiting duration for the voice instruction of the user is determined as a third waiting duration, and the third waiting duration is less than the first waiting duration; and executing step S322. Similarly, the third waiting duration of this embodiment may also be set based on actual experience. For example, it may be set to 160 ms, 180 ms or other lengths of period, in short, the third waiting duration may be less than the first waiting duration, and the specific duration is not limited here.

In S308, whether the waiting duration when receiving the voice instruction of the user reaches the first waiting duration or not is detected. If the waiting duration reaches the first waiting duration, controlling the voice interaction device to respond to the voice instruction of the user based on the first waiting duration and ending; and if the waiting duration does not reach the first waiting duration, executing step S309.

In S309, whether a supplementary voice instruction from the user is received or not is detected. If the supplementary voice instruction from the user is not received, returning to step S308 to continue the detection; and if the supplementary voice instruction from the user is received, executing step S310. It should be noted that the supplementary voice instruction received from the user is still monitored by the voice interaction device and uploaded to the cloud server.

In S319, whether the supplementary voice instruction of the user is a high-frequency instruction or not is detected based on the preset high-frequency instruction library. If the supplementary voice instruction of the user is not a high-frequency instruction, executing step S311; and if the supplementary voice instruction of the user is a high-frequency instruction, executing step S323.

In S311, a second integrity of a combined instruction containing the voice instruction of the user and the supplementary voice instruction of the user is determined by using the integrity detection model; and executing step S312. The process is the same as the implementation process of determining the first integrity of the voice instruction of the user by using the integrity detection model mentioned in the above embodiment, and it is not described here.

In S312, whether the second integrity is greater than the first integrity or not is detected. If the second integrity is greater than the first integrity, executing step S313. And if not; no operation is executed now, continuing to maintain the first waiting duration determined in step S305; and returning to step S308 to continue the detection.

In S313, the waiting duration is updated based on the second integrity and preset integrity threshold; and executing step S314. The waiting duration is a period between a time when the voice interaction device determines that receiving the supplementary, voice instruction is completed and a time when the voice interaction device performs an operation in response to the combined instruction of the user.

Specifically, in this branch, since the first integrity in steps S304 to S305 described above is greater than the preset integrity threshold and the second integrity is greater than the first integrity, the second integrity in the branch is greater than the preset integrity threshold. Therefore, the update configuration may include the following steps;

(a1) deleting the waiting duration for the voice instruction of the user, that is, deleting the first waiting duration described above; and (b1) determining that the waiting duration for the combined instruction is the first waiting duration in response to the second integrity being greater than the preset integrity threshold. The waiting duration for the combined instruction indicates a length of period between a time when the voice interaction device determines that receiving the supplementary voice instruction is completed and a time when the voice interaction device performs an operation in response to the combined instruction.

That is, the waiting duration is also the first waiting duration, the difference is that the previous waiting duration starts at the end of the voice instruction of the user, and the updated waiting duration starts at the end of the user's supplementary voice instruction.

In practice, a "fast" asking from a user refers to an accurate and fast expression of a question, and the user expects to obtain a quick response in voice interaction. A "hesitant" asking from a user refers to the user describing a question in a hesitant and segmented manner in voice interaction, which makes the description of the question more complete, and the user expects to obtain a more accurate response. The technical solution of the embodiments may realize a response based on the user's "fast" asking by determining a waiting duration between a time when a voice interaction device determines that receiving the voice instruction is completed and a time when the voice interaction device performs an operation in response to the voice instruction of the user. By updating the configuration information, the user's "hesitant" question including at least two segments may be regarded as a complete question and thus be responded to. A balance between the "fast" asking and the "hesitant" asking is achieved, and the intelligence of voice interaction may be effectively improved.

In S314, whether the waiting duration when receiving the user's supplementary voice instruction reaches the first waiting duration or not is detected. If the waiting duration from receiving the user's supplementary voice instruction reaches the first waiting duration, then controlling the control voice interaction device to respond to the combined instruction based on the first waiting duration and ending. And if the waiting duration does not reach the first waiting duration, remaining in step S314 to continue the detection.

It is noted that in step S314, the user only supplementing the supplementary voice instruction once is taken as an example. In practice, in a period when the waiting duration from receiving the user's supplementary voice instruction does not reach the first waiting duration, it is still possible to continue to receive a next supplementary voice instruction from the user, and similarly, a plurality of voice instructions may be supplemented according to the logic, so as to realize multiple interaction when one wake-up. For details, the above steps S308 to S313 may be executed again, which will not be repeated here.

In S315, whether the waiting duration when receiving the voice instruction of the user reaches the second waiting duration or not is detected. If the waiting duration when receiving the voice instruction of the user reaches the second waiting duration, then controlling the voice interaction device to respond to the voice instruction of the user based on the second waiting duration and ending. And if the waiting duration when receiving the voice instruction of the user does not reach the second waiting duration, executing step S316.

In S316, whether the supplementary voice instruction from the user is received or not is detected. If the supplementary voice instruction from the user is not received, then returning to step S315 to continue the detection. And if the supplementary voice instruction from the user is received, executing step S317.

In S317, whether the supplementary voice instruction from the user is a high-frequency instruction or not is detected based on the preset high-frequency instruction library. If the supplementary voice instruction from the user is not a high-frequency instruction, then executing step S318. And if the supplementary voice instruction from the user is a high-frequency instruction, executing step S323.

In S318, a second integrity of a combined instruction composed of the voice instruction of the user and the supplementary voice instruction of the user is determined by using the integrity detection model; and step S319 is executed.

In S319, whether the second integrity is greater than the first integrity or not is detected. If the second integrity is greater than the first integrity, executing step S320; and if the second integrity is not greater than the first integrity, no operation is executed now, continuing to maintain the second waiting duration determined in step S306, and returning to step S316 to continue the detection.

In S320, the waiting duration between a time when the voice interaction device determines that receiving the supplementary voice instruction is completed and a time when the voice interaction device performs an operation in response to the combined instruction of the user is updated based on the second integrity and preset integrity threshold; and step S321 is executed.

Specifically, in this branch, although the first integrity is less than the preset integrity threshold in the steps S304 and S306 described above, and the second integrity is greater than the first integrity, it is not known whether the second integrity is greater than the preset integrity threshold. Therefore, in this branch, it may determine whether the second integrity is greater than the preset integrity threshold or not, so that the configuration may be updated. The details may be as follows:
  (a2) deleting the waiting duration for the voice instruction of the user, that is, deleting the second waiting duration described above; and
  (b2) determining whether the second integrity is greater than the preset integrity, threshold or not. If the second integrity is greater than the preset integrity threshold, determining that the waiting duration for the combined instruction is the first waiting duration, and the waiting duration for the combined instruction indicates a length of period between a time when the voice interaction device determines that receiving the supplementary voice instruction is completed and a time when the voice interaction device performs an operation in response to the combined instruction. If the second integrity is not greater than the preset integrity threshold, determining that the waiting duration for the combined instruction is the second waiting duration.

In S321, whether the waiting duration when receiving the user's supplementary voice instruction reaches the determined waiting duration or not is detected. If the waiting duration when receiving the user's supplementary voice instruction reaches the determined waiting duration, controlling the voice interaction device to respond to the combined instruction based on the determined waiting duration and ending. If the waiting duration when receiving the user's supplementary voice instruction does not reach the determined waiting duration, remaining in step S321 to continue the detection.

In S322, whether the waiting duration from receiving the voice instruction of the user reaches the third waiting duration or not is detected. If the waiting duration after receiving the voice instruction of the user reaches the third waiting duration, then controlling the voice interaction device to respond to the voice instruction of the user based on the third waiting duration and ending. If the waiting duration after receiving the voice instruction of the user does not reach the third waiting duration, remaining in step S322 to continue the detection.

As the voice instruction of the user is a high-frequency instruction and the third waiting duration is short, the supplementary voice instruction of the user is no longer detected in the process.

Alternatively, after the step S322, in a period when the waiting duration after receiving the voice instruction of the user does not reach the third waiting duration, it may detect whether a next high-frequency instruction is received or not. If received, the waiting duration for the next high-frequency instruction is determined as the third waiting duration in the same way. The implementation principle is the same as that of a previous high-frequency instruction. At this time, an operation in response to the previous high-frequency instruction is not performed, and a new high-frequency instruction is received. The operation in response to the previous high-frequency execution may not be performed, and an operation in response to the new high-frequency instruction may be performed.

In S323, the waiting duration between a time when the voice interaction device determines that receiving the supplementary voice instruction is completed and a time when the voice interaction device performs an operation in response to the combined instruction of the user is updated; and step S324 is executed.

As the supplementary voice instruction received from the user is high-frequency instruction, the update configuration may include the following steps:
  (a3) deleting the waiting duration for the voice instruction of the user, that is, deleting the first waiting duration described above;
  (b3) determining that the waiting duration for the supplementary voice instruction is the third waiting duration. The waiting duration for the supplementary voice instruction indicates a length of period between a time when the voice interaction device determines that receiving the supplementary voice instruction is completed and a time when the voice interaction device performs an operation in response to the supplementary voice instruction.

That is, the operation in response to the voice instruction of the user is no longer performed, and the waiting duration for the supplementary voice instruction is directly determined. The waiting duration for the supplementary voice instruction indicates a length of period between a time when the voice interaction device determines that receiving the supplementary voice instruction is completed and a time when the voice interaction device performs an operation in response to the supplementary voice instruction, so that the user's supplementary voice instruction may be accurately responded to. Similarly, the solution may balance the response for the "fast" asking and the response for the "hesitant" asking, and effectively improve the intelligence of voice interaction.

In S324, whether the waiting duration after receiving the user's supplementary voice instruction reaches the third waiting duration or not is detected. If the waiting duration from receiving the user's supplementary voice instruction reaches the third waiting duration, controlling the voice interaction device to respond to the supplementary voice instruction of the user based on the third waiting duration and ending; and if the waiting duration from receiving the user's supplementary voice instruction does not reach the third waiting duration, remaining in step S324 to continue the detection.

By comparing the steps S305, S306 and S307, it may be found that if the voice instruction of the user is a high-frequency instruction which is a very clear instruction and the integrity thereof is very high, the shortest waiting duration, such as the third waiting duration, may be set, and the shortest waiting duration may be determined so as to respond the fastest. If the first integrity of the voice instruction of the user is better, that is, the first integrity is greater than the preset integrity threshold. At this time, the integrity of the voice instruction of the user may be considered to be relatively good, it may be considered as complete, and a little shorter waiting duration may be set as the first waiting duration for the voice instruction of the user. If the first integrity of the voice instruction of the user is poor, that is, less than the preset integrity threshold, at this time, the integrity of the voice instruction of the user is considered to be poor, and it may be considered incomplete. A little longer waiting duration may be set as the second waiting duration for the voice instruction of the user, so as to detect whether the user needs to supplement a voice instruction to increase the integrity of voice instruction, and the voice instruction of the user may be responded to more effectively. For example, in a process of the user describing a question, there is hesitation. Because of the pause of the voice instruction of the user during the hesitation process, the voice interaction device may collect the voice instruction of the user and the supplemented voice instruction in segments, and adopt the solution of the embodiments to realize multiple interaction at a time to accurately respond to the voice instruction of the user, which may effectively balance the user's "fast" asking and "hesitant" asking, and determine different waiting durations for different situations to respond pertinently and enhance the intelligence of voice interaction device.

In the process of the processing of the embodiments, there is a certain priority order for the detection of the high-frequency instruction and the integrity determination. For any voice instruction of the user, it is necessary to detect whether the voice instruction of the user is a high-frequency instruction or not, and then determine the integrity of the voice instruction of the user.

In the embodiments, the integrity is processed in two segments, such as the first integrity may be segmented based on the integrity threshold. In practice, the integrity may be classified more carefully according to the actual needs. For example, two different integrity thresholds may be set, such as a first integrity threshold and a second integrity threshold. The first integrity threshold is greater than the second integrity threshold. If the first integrity is greater than or equal to the first integrity threshold, then a waiting duration between a time when a voice interaction device determines that receiving the voice instruction is completed and a time when the voice interaction device performs an operation in response to the voice instruction of the user is determined as a fourth waiting duration. If the first integrity is less than the first integrity threshold and is greater than or equal to the second integrity threshold, then a waiting duration between a time when a voice interaction device determines that receiving the voice instruction is completed and a time when the voice interaction device performs an operation in response to the voice instruction of the user is determined as a fifth waiting duration. If the first integrity is less than the second integrity threshold, a waiting duration between a time when a voice interaction device determines that receiving the voice instruction is completed and a time when the voice interaction device performs an operation in response to the voice instruction of the user is determined as a sixth waiting duration, and so on. In turn, the integrity may be also classified with a higher accuracy, to determine waiting durations in different classifications, which will not be repeated here.

The method for processing voice interaction according to the embodiments may effectively balance the user's "fast" asking and "hesitant" asking by adopting the above technical solutions, realize the one-time wake-up and multiple interactions between the user and the voice interaction device, which may effectively improve the intelligence of voice interaction and enhance the user's use experience.

Figure 4:
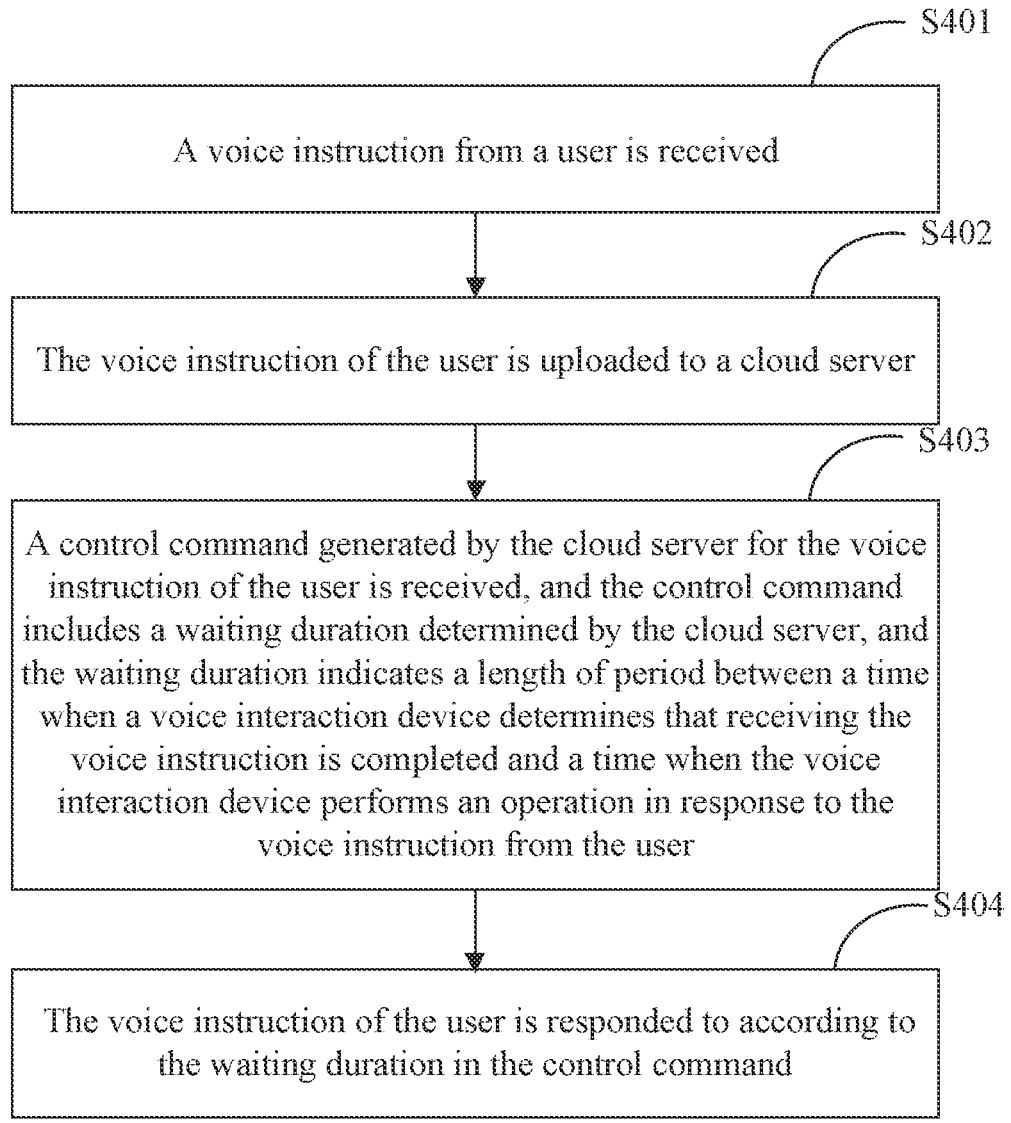
FIG. 4 shows a schematic diagram according to a third embodiment of the present disclosure.

FIG. 4 shows a schematic diagram according to a third embodiment of the present disclosure. As shown in FIG. 4, this embodiment provides a method for processing voice interaction, and the method may include the following steps.

In S401, a voice instruction from a user is received.

In S402, the voice instruction of the user is uploaded to a cloud server.

In S403, a control command generated by the cloud server for the voice instruction of the user is received. The control command includes a waiting duration determined by the cloud server, and the waiting duration indicates a length of period between a time when a voice interaction device determines that receiving the voice instruction is completed and a time when the voice interaction device performs an operation in response to the voice instruction from the user.

In S404, the voice instruction of the user is responded to according to the waiting duration contained in the control command.

An execution entity of the method for processing voice interaction in the embodiment is a voice interaction device, which is a device located on the terminal side. For example, the voice interaction device may be a smart speaker, a smart home device, and a smart vehicle device, etc.

In a scene of voice interaction, after the user sends a voice instruction, the voice instruction from the user is collected and received by the voice interaction device. However, in a scene of the embodiment, the voice interaction device may upload the voice instruction of the user directly to the cloud server instead of directly processing the voice instruction of the user. Accordingly, when receiving the voice instruction of the user, the cloud server may process the voice instruction based on the voice instruction of the user in the way of the embodiment shown in FIG. 1 mentioned above. If it detects that the voice instruction of the user is not a high-frequency instruction, the pre-trained integrity detection model is used to determine the first integrity of the voice instruction of the user; and a waiting duration for the voice instruction of the user is determined based on the first integrity and a preset integrity threshold. The waiting duration for the voice instruction indicates a length of period between a time when a voice interaction device determines that receiving the voice instruction is completed and a time when the voice interaction device performs an operation in response to the voice instruction of the user. Alternatively, according to the embodiment shown in FIG. 3A, FIG. 3B, FIG. 3C, and FIG. 3D, a waiting duration for the voice instruction indicating a length of period between a time when a voice interaction device determines that receiving the voice instruction is completed and a time when the voice interaction device performs an operation in response to the voice instruction of the user is determined, and a control command including the waiting duration determined by the cloud server is transmitted to the voice interaction device. The process of determining the waiting duration in detail may also refer to the embodiments shown in FIG. 1 or FIG. 3A, FIG. 3B, FIG. 3C, and FIG. 3D described above, which will not be repeated here.

The method for processing voice interaction according to the embodiment includes: receiving a voice instruction of the user; uploading the voice instruction of the user to the cloud server; receiving a control command generated by the cloud server based on the voice instruction of the user, the control command including a waiting duration determined by the cloud server, in which the waiting duration for the voice instruction indicates a length of period between a time when a voice interaction device determines that receiving the voice instruction is completed and a time when the voice interaction device performs an operation in response to the voice instruction of the user; and responding to the voice instruction of the user according to the waiting duration in the control command. The technical solution of the embodiment does not need to respond immediately after the voice instruction of the user ends, thereby avoiding the "scramble" phenomenon of the voice interaction device. The voice instruction of the user may be responded to according to the waiting duration determined by the cloud server, which effectively enhancing the intelligence of voice interaction device.

Figure 5:
FIG. 5 shows a schematic diagram according to a fourth embodiment of the present disclosure.

FIG. 5 shows a schematic diagram according to a fourth embodiment of the present disclosure. As shown in FIG. 5, this embodiment specifically provides an example of a method for processing voice interaction. The user's voice input as follows: I want to listen to /Singer A/Song X/Next is taken as an example.

The following describes the voice interaction process of the example by using the technical solution according to the embodiments of the present disclosure.

As shown in FIG. 5, the cloud server receives a first voice instruction "I want to listen" from the user uploaded by the voice interaction device. The cloud server first detects whether the first voice instruction is a high-frequency instruction or not. If the first voice instruction is not a high-frequency instruction, the integrity detection model is used to determine an integrity of the first voice instruction. For example, the integrity is determined to be the first integrity. Then, it is determined whether the first integrity is greater than or equal to the preset integrity threshold or not. For example, in this embodiment, the first integrity is detected to be less than the preset integrity threshold. At this time, a waiting duration for the first voice instruction of the user may be determined as the second waiting duration, and the waiting duration indicates a length of period between a time when the voice interaction device determines that receiving the first voice instruction is completed and a time when the voice interaction device performs an operation in response to the first voice instruction of the user.

Further, as shown in FIG. 5, in a period during that the waiting duration from the end of receiving the first voice instruction does not reach the second wafting duration, the cloud server receives a second voice instruction "Singer A" from the user uploaded by the voice interaction device again. At this time, the cloud server first detects whether the "Singer A" is a high-frequency instruction or not. If the "Singer A" is not a high-frequency, instruction, the second voice instruction may be determined as a supplementary instruction for the first voice instruction. At this time, the first voice instruction and the second voice instruction may be combined to form a combined instruction "I want to listen to singer A". An integrity of the combined instruction is determined by using the integrity detection model. For example, the integrity is determined to be the second integrity. Then, whether the second integrity is greater than the first integrity or not is determined. If the second integrity is greater than the first integrity, whether the second integrity is greater than or equal to the preset integrity threshold or not is further determined. For example, in this embodiment, it is determined that the second integrity is exactly greater than the preset integrity threshold. At this time, the original waiting duration is deleted, that is, the second waiting duration for the first voice instruction of the user is deleted. The updated waiting duration is the first waiting duration for a combined instruction composed of the first voice instruction and the second voice instruction. The waiting duration indicates a length of period between a time when the voice interaction device determines that receiving the second voice instruction is completed and a time when the voice interaction device performs an operation in response to the combined instruction of the user.

Further, as shown in FIG. 5, in a period during that the waiting duration from the end of receiving the second voice instruction does not reach the first waiting duration, the cloud server receives a third voice instruction "Song X" from the user uploaded by the voice interaction device again. At this time, the cloud server first detects whether the "Song X" is a high-frequency instruction or not. If the "Song X" is not a high-frequency command, the third voice instruction is determined as a supplementary instruction for the first voice instruction and the second voice instruction. At this time, the first voice instruction, the second voice instruction and the third voice instruction may be combined to form a combined instruction "I want to listen to song X of singer A", which means that song X is a song of singer A. The integrity test model is used to determine an integrity of the combined instruction. For example, the integrity is determined to be the third integrity. Then, whether the third integrity is greater than the second integrity or not is determined, and then it is detected that the third integrity is indeed greater than the second integrity. As the second integrity is greater than the preset integrity threshold, the third integrity is greater than the second integrity, and the third integrity is necessarily greater than the preset integrity threshold. Therefore, the original waiting duration may be deleted at this time. That is, the first waiting duration for the combined instruction composed of the first voice instruction and the second voice instruction may be deleted, and the updated waiting duration is the first waiting duration for a combined instruction composed of the first voice instruction, the second voice instruction and the third voice instruction. The updated waiting duration indicates a length of period between a time when the voice interaction device determines that receiving the third voice instruction is completed and a time when the voice interaction device performs an operation in response to the combined instruction composed of the first voice instruction, the second voice instruction and the third voice instruction.

Further, as shown in FIG. 5, in a period during that the waiting duration from the end of receiving the third voice instruction does not reach the first waiting duration, the cloud server receives a fourth voice instruction "Next" from the user uploaded by the voice interaction device again. At this time, the cloud server first detects whether the "Next" is a high-frequency instruction, and then it is detected that the "Next" is a high-frequency instruction. That is, the high-frequency instruction is an independent instruction, and it is not combined with previous voice instructions to form a combined instruction. At this time, there is no need for integrity determination. The original waiting duration is deleted directly. That is, the first waiting duration for the combined instruction composed of the first voice instruction, the second voice instruction and the third voice instruction is deleted. The updated waiting duration is the third waiting duration for the fourth voice instruction, and the updated waiting duration indicates a length of period between a time when the voice interaction device determines that receiving the fourth voice instruction is completed and a time when the voice interaction device performs an operation in response to the fourth voice instruction.

The method for processing voice interaction according to the embodiments may effectively balance the user's "fast" asking and "hesitant" asking by adopting the above technical solutions, realize the one-time wake-up and multiple interactions between the user and the voice interaction device, which may effectively improve the intelligence of voice interaction and enhance the user's use experience.

Figure 6:
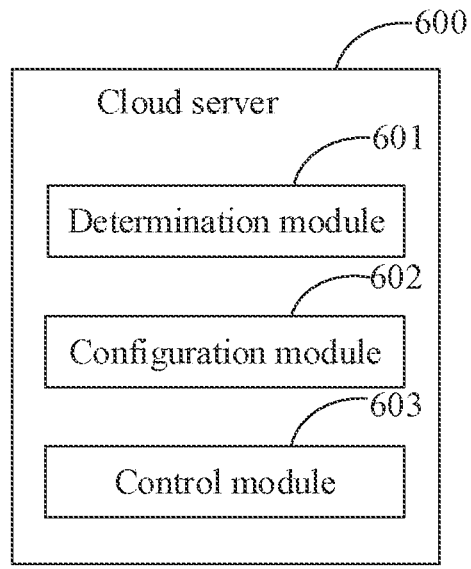
FIG. 6 shows a schematic diagram according to a fifth embodiment of the present disclosure.

FIG. 6 shows a schematic diagram according to a fifth embodiment of the present disclosure. As shown in FIG. 6, the embodiment provides a cloud server 600.

The cloud server 600 includes: a determination module 601 used to determine a first integrity of a voice instruction from a user by using a pre-trained integrity detection model in response to detecting that the voice instruction of the user is not a high-frequency instruction; a configuration module 602 used to determine a waiting duration for the voice instruction based on the first integrity and a preset integrity threshold, and the waiting duration for the voice instruction indicates a length of period between a time when a voice interaction device determines that receiving the voice instruction is completed and a time when the voice interaction device performs an operation in response to the voice instruction of the user; and a control module 603 used to control the voice interaction device to respond to the voice instruction of the user based on the waiting duration.

The cloud server 600 of the embodiment realizes the realization principle and technical effect of voice interaction processing by using the modules described above, and an implementation thereof is the same as the implementation of the methods according to the embodiments described above. Please refer to the embodiments described above in detail, which will not be repeated here.

Figure 7:
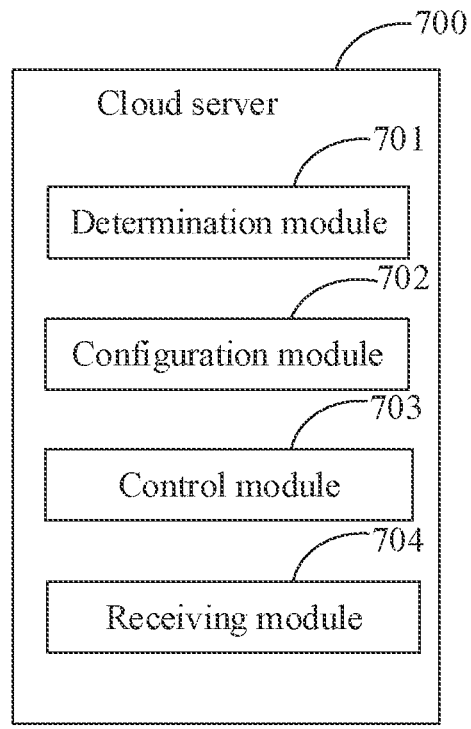
FIG. 7 shows a schematic diagram according to a sixth embodiment of the present disclosure.

FIG. 7 shows a schematic diagram according to a sixth embodiment of the present disclosure. As shown in FIG. 7, the cloud server 700 of the embodiment further provides the technical solution of the present disclosure in more detail based on the technical solution of the embodiment shown in FIG. 6 above. A determination module 701, a configuration module 702 and a control module 703 in the cloud server 700 of the embodiment are the same as those of determination module 601, configuration module 602 and control module 603 in the cloud server 600 in the embodiment shown in FIG. 6.

Further, the configuration module 702 in the cloud server 700 of the embodiment is specifically used to determine that the waiting duration for the voice instruction of the user is a first waiting duration, in response to the first integrity being greater than or equal to the preset integrity threshold.

Further optionally, the configuration module 702 in the cloud server 700 of the embodiment is further used to determine that the waiting duration for the voice instruction of the user is a second waiting duration, in response to the first integrity being less than the preset integrity threshold, and the second waiting duration is greater than the first waiting duration.

Further optionally, as shown in FIG. 7, the cloud server 700 of the embodiment further includes a receiving module 704 used to receive a supplementary voice instruction from the user within the waiting duration for the voice instruction.

The determination module 701 is further used to determine a second integrity of a combined instruction composed of the voice instruction of the user and the supplementary voice instruction of the user by using the integrity detection model in response to detecting that the supplementary voice instruction is not a high-frequency instruction.

The configuration module 702 is further used to determine a waiting duration for the combined instruction based on the second integrity and the preset integrity threshold in response to determining that the second integrity is greater than the first integrity, and the waiting duration for the combined instruction indicates a length of period between a time when the voice interaction device determines that receiving the supplementary voice instruction is completed and a time when the voice interaction device performs an operation in response to the combined instruction.

Further optionally, the configuration module 702 in the cloud server 700 of the embodiment is used to delete the waiting duration for the voice instruction; and determine a waiting duration for the combined instruction based on the second integrity and the preset integrity threshold.

Further optionally, the configuration module 702 in the cloud server 700 of the embodiment is used to determine that the waiting duration for the combined instruction is a first waiting duration in response to the second integrity being greater than or equal to the preset integrity threshold; or determine that the waiting duration for the combined instruction is a second waiting duration in response to the second integrity being less than the preset integrity threshold, and the second waiting duration is greater than the first waiting duration.

Further optionally, the configuration module 702 in the cloud server 700 of the embodiment is further used determine that the waiting duration for the voice instruction or the waiting duration for the supplementary voice instruction is a third waiting duration, in response to detecting that the voice instruction or the supplementary voice instruction is a high-frequency instruction, and the third waiting duration is less than the first waiting duration.

The control module 783 of the embodiment is further used to control the voice interaction device to respond to the voice instruction of the user or the supplementary voice instruction of the user according to the third waiting duration.

The cloud server 700 of the embodiment realizes the realization principle and technical effect of voice interaction processing by using the modules described above, and an implementation thereof is the same as the implementation of the methods according to the embodiments described above. Please refer to the embodiments described above in detail, which will not be repeated here.

Figure 8:
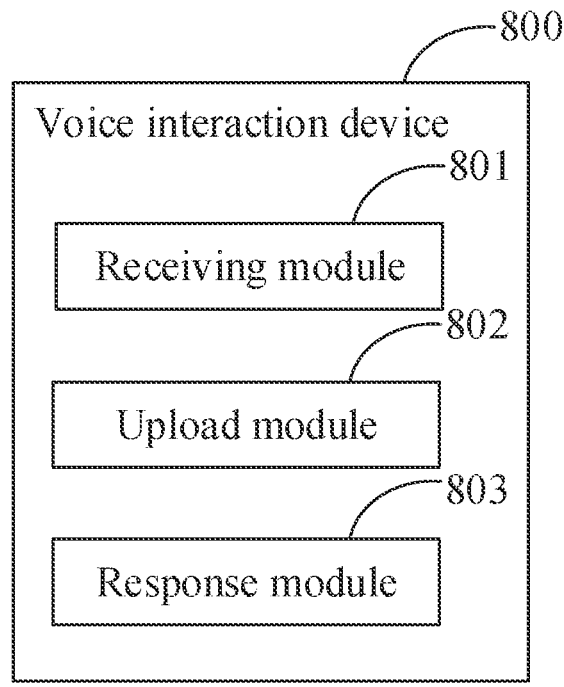
FIG. 8 shows a schematic diagram according to a seventh embodiment of the present disclosure.

FIG. 8 shows a schematic diagram according to a seventh embodiment of the present disclosure. As shown in FIG. 8, the embodiment provides a voice interaction device 800, and the voice interaction device 800 includes: a receiving module 801 used to receive a voice instruction from a user; an upload module 802 used to upload the voice instruction of the user to a cloud server, in which the receiving module 801 is further used to receive a control command generated by the cloud server for the voice instruction of the user, and the control command includes a waiting duration determined by the cloud server, and the waiting duration indicates a length of period between a time when the voice interaction device determines that receiving the voice instruction is completed and a time when the voice interaction device performs an operation in response to the voice instruction from the user; and a response module 803 used to respond to the voice instruction of the user according to the waiting duration in the control command.

The voice interaction device 800 of the embodiment realizes the realization principle and technical effect of voice interaction processing by using the modules described above, and an implementation thereof is the same as the implementation of the methods according to the embodiments described above, Please refer to the embodiments described above in detail, which will not be repeated here.

Figure 9:
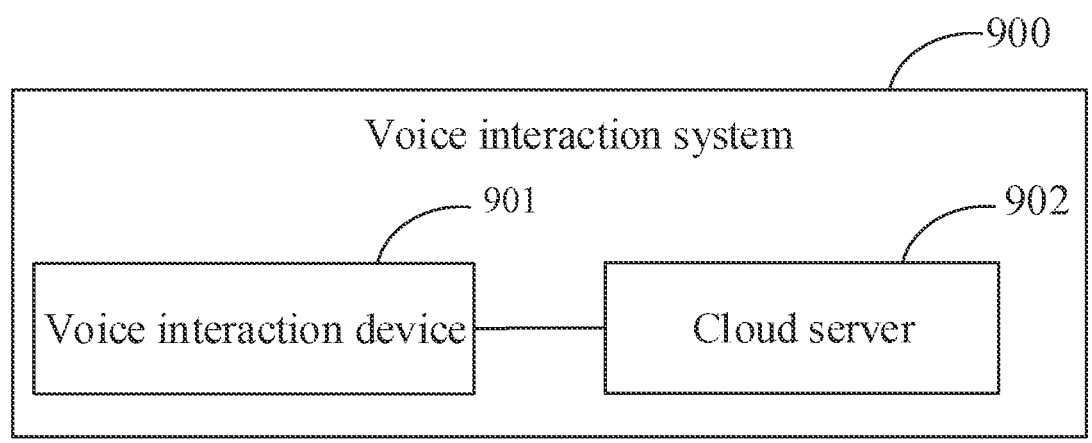
FIG. 9 shows a schematic diagram according to an eighth embodiment of the present disclosure.

FIG. 9 shows a schematic diagram according to an eighth embodiment of the present disclosure. As shown in FIG. 9, the embodiment provides a voice interaction system 900, and the voice interaction system 900 includes: a voice interaction device 901 and a cloud server 902. The cloud server 902 is in communication with the voice interaction device 901.

The cloud server 902 adopts the cloud server as described in FIG. 6 or FIG. 7 above; and the voice interaction device 901 adopts the voice interaction device of the embodiment as shown in FIG. 8 above. Moreover, the voice interaction processing may be realized by using the method for processing voice interaction of the embodiments shown in FIG. 1 to FIG. 5 above. Please refer to the embodiments described above in detail, which will not be repeated here.

According to the embodiments of the present disclosure, the present disclosure further provides an electronic device and a readable storage medium.

Figure 10:
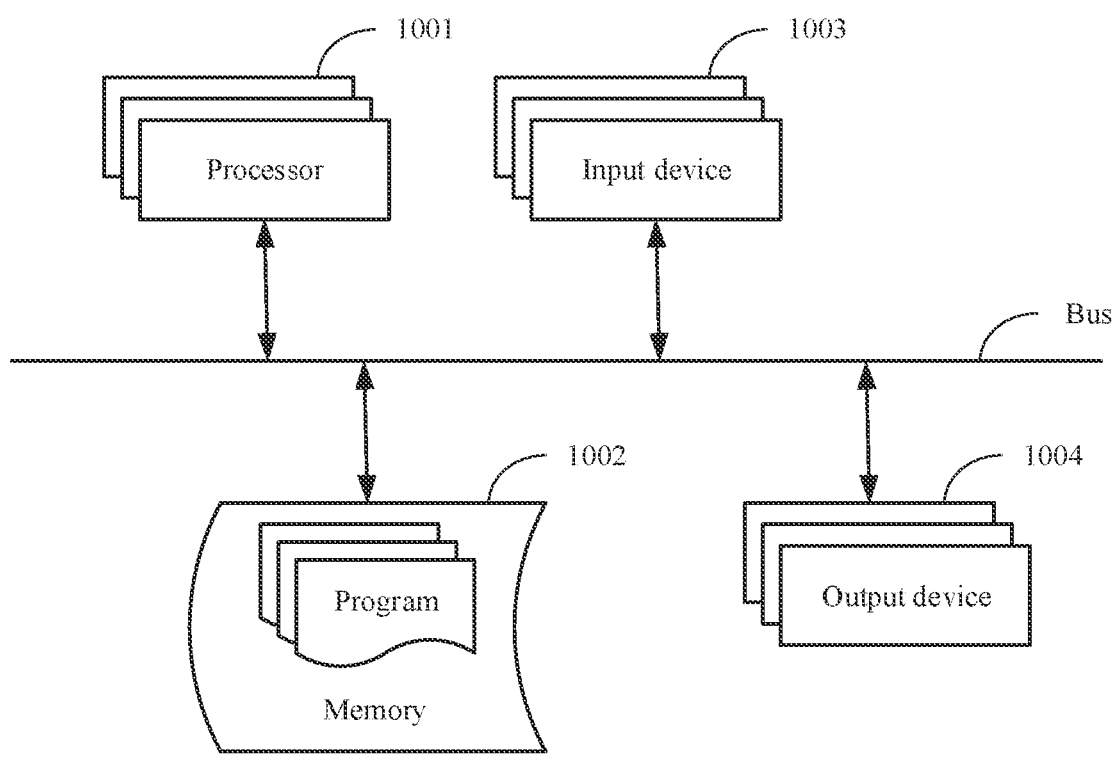
FIG. 10 shows a block diagram of an electronic device for realizing a method for processing voice interaction according to the embodiments of the present disclosure.

FIG. 10 shows a block diagram of an electronic device implementing the method for processing voice interaction according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components, connections and relationships between the components, and functions of the components in the present disclosure are merely examples, and are not intended to limit the implementation of the present disclosure described and/or required herein.

As shown in FIG. 10, the electronic device may include one or more processors 1001, a memory 1002, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 10, a processor 1001 is illustrated by way of an example.

The memory 1002 is a non-transitory computer-readable storage medium provided by the present disclosure. The memory stores instructions executable by at least one processor, so that the at least one processor executes the method for processing voice interaction provided by the present disclosure. The non-transitory computer-readable storage medium of the present disclosure stores computer instructions for allowing a computer to execute the method for processing voice interaction provided by the present disclosure.

The memory 1002, as a non-transitory computer-readable storage medium, may be used to store non-transitory software programs, non-transitory computer-executable programs and modules, such as program instructions/modules (for example, the modules shown in the FIGS. 7, 8 and 9) corresponding to the method for processing voice interaction in the embodiments of the present disclosure. The processor 1001 executes various functional applications and data processing of the server by executing the non-transient software programs, instructions and modules stored in the memory 1002, thereby implementing the method for processing voice interaction in the embodiments of the method mentioned above.

The memory 1002 may include a program storage area and a data storage area. The program storage area may store an operating system and an application program required by at least one function. The data storage area may store data etc. generated by using the electronic device according to the method for processing voice interaction. In addition, the memory 1002 may include a high-speed random access memory, and may further include a non-transitory memory, such as at least one magnetic disk storage device, a flash memory device, or other non-transitory solid-state storage devices. In some embodiments, the memory 1002 may optionally include a memory provided remotely with respect to the processor 1001, and such remote memory may be connected through a network to the electronic device implementing the method for processing voice interaction. Examples of the above-mentioned network include, but are not limited to the internet, intranet, local area network, mobile communication network, and combination thereof.

The electronic device implementing the method for processing voice interaction may further include an input device 1003 and an output device 1004. The processor 1001, the memory 1002, the input device 1003 and the output device 1004 may be connected by a bus or in other manners. In FIG. 10, the connection by a bus is illustrated by way of an example.

The input device 1003 may receive input information of numbers or character, and generate key input signals related to user settings and function control of the electronic device, such as a touch screen, a keypad, a mouse, a track pad, a touchpad, a pointing stick, one or more mouse buttons, a trackball, a joystick, and so on. The output device 1004 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred to as programs, software, software applications, or codes) contain machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), internet and a blockchain network.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, and the server is a host product in the cloud computing service system to solve shortcomings of difficult management and weak business scalability in conventional physical host and VPS services ("Virtual Private Server" or "VPS" for short).

The technical solutions of the embodiments of the present disclosure do not need to respond immediately when the voice instruction of the user ends, thereby avoiding the "scramble" phenomenon of the voice interaction device. The waiting duration between a time when a voice interaction device determines that receiving the voice instruction is completed and a time when the voice interaction device performs an operation in response to the voice instruction of the user may be determined, and the voice interaction device is controlled to respond to the voice instruction of the user based on the waiting duration, which effectively enhancing the intelligence of the voice interaction device.

The technical solutions of the embodiments of the present disclosure may effectively balance the user's "fast" asking and "hesitant" asking, realize the one-time wake-up and multiple interactions between the user and the voice interaction device, which may effectively improve the intelligence of voice interaction and enhance the user's use experience.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

The invention claimed is:

1. A method for processing voice interaction, comprising:
   determining a first integrity of a voice instruction from a user by using a pre-trained integrity detection model in response to detecting that the voice instruction from the user is not a high-frequency instruction;
   determining a waiting duration for the voice instruction based on the first integrity and a preset integrity threshold, wherein the waiting duration for the voice instruction indicates a length of period between a time when a voice interaction device determines that receiving the voice instruction is completed and a time when the voice interaction device performs an operation in response to the voice instruction of the user; and controlling the voice interaction device to respond to the voice instruction of the user based on the waiting duration;

wherein the method further comprises: prior to responding to the voice instruction based on the waiting duration for the voice instruction, receiving a supplementary voice instruction from the user within the waiting duration for the voice instruction;

determining a second integrity of a combined instruction composed of the voice instruction of the user and the supplementary voice instruction of the user by using the integrity detection model in response to detecting that the supplementary voice instruction is not a high-frequency instruction; and determining a waiting duration for the combined instruction based on the second integrity and the preset integrity threshold in response to determining that the second integrity is greater than the first integrity, wherein the waiting duration for the combined instruction indicates a length of period between a time when the voice interaction device determines that receiving the supplementary voice instruction is completed and a time when the voice interaction device performs an operation in response to the combined instruction.

2. The method according to claim 1, wherein the determining a waiting duration for the voice instruction based on the first integrity and a preset integrity threshold comprises:

determining that the waiting duration for the voice instruction is a first waiting duration, in response to the first integrity being greater than or equal to the preset integrity threshold.

3. The method according to claim 2, wherein the determining a waiting duration for the voice instruction based on the first integrity and a preset integrity threshold further comprises:

determining that the waiting duration for the voice instruction is a second waiting duration, in response to the first integrity being less than the preset integrity threshold, wherein the second waiting duration is greater than the first waiting duration.

4. The method according to claim 1, wherein the determining a waiting duration for the combined instruction comprises:

deleting the waiting duration for the voice instruction; and determining a waiting duration for the combined instruction based on the second integrity and the preset integrity threshold.

5. The method according to claim 4, wherein the determining a waiting duration for the combined instruction further comprises:

determining that the waiting duration for the combined instruction is a first waiting duration in response to the second integrity being greater than or equal to the preset integrity threshold; or determining that the waiting duration for the combined instruction is a second waiting duration in response to the second integrity being less than the preset integrity threshold, wherein the second waiting duration is greater than the first waiting duration.

6. The method according to claim 1, further comprises:

determining that the waiting duration for the voice instruction or a waiting duration for the supplementary voice instruction is a third waiting duration, in response to detecting that the voice instruction is a high-frequency instruction, and wherein the third waiting duration is less than the first waiting duration; and responding to the voice instruction from the user or the supplementary voice instruction from the user according to the third waiting duration.

7. A method for processing voice interaction, comprising:

receiving a voice instruction from a user;

uploading the voice instruction of the user to a cloud server;

receiving a control command generated by the cloud server for the voice instruction from the user, wherein the control command comprises a waiting duration determined by the cloud server, and the waiting duration indicates a length of period between a time when a voice interaction device determines that receiving the voice instruction is completed and a time when the voice interaction device performs an operation in response to the voice instruction from the user; and responding to the voice instruction according to the waiting duration in the control command;

wherein the waiting duration is determined by:

determining a first integrity of a voice instruction from a user by using a pre-trained integrity detection model in response to detecting that the voice instruction from the user is not a high-frequency instruction;

determining a waiting duration for the voice instruction based on the first integrity and a preset integrity threshold, wherein the waiting duration for the voice instruction indicates a length of period between a time when a voice interaction device determines that receiving the voice instruction is completed and a time when the voice interaction device performs an operation in response to the voice instruction of the user;

wherein the method further comprises: prior to responding to the voice instruction based on the waiting duration for the voice instruction, receiving a supplementary voice instruction from the user within the waiting duration for the voice instruction;

determining a second integrity of a combined instruction composed of the voice instruction of the user and the supplementary voice instruction of the user by using the integrity detection model in response to detecting that the supplementary voice instruction is not a high-frequency instruction; and determining a waiting duration for the combined instruction based on the second integrity and the preset integrity threshold in response to determining that the second integrity is greater than the first integrity, wherein the waiting duration for the combined instruction indicates a length of period between a time when the voice interaction device determines that receiving the supplementary voice instruction is completed and a time when the voice interaction device performs an operation in response to the combined instruction.

8. An electronic device, comprising:
at least one processor; and
a memory in communication with the at least one processor;
wherein the memory stores instructions executable by the at least one processor, and the instructions, when executed by the at least one processor, cause the at least one processor to perform operations of:
determining a first integrity of a voice instruction from a user by using a pre-trained integrity detection model in response to detecting that the voice instruction from the user is not a high-frequency instruction;
determining a waiting duration for the voice instruction based on the first integrity and a preset integrity threshold, wherein the waiting duration for the voice instruction indicates a length of period between a time when a voice interaction device determines that receiving the voice instruction is completed and a time when the voice interaction device performs an operation in response to the voice instruction of the user; and
controlling the voice interaction device to respond to the voice instruction of the user based on the waiting duration;
wherein the instructions, when executed by the at least one processor, cause the at least one processor further to perform operations of, prior to responding to the voice instruction based on the waiting duration for the voice instruction:
receiving a supplementary voice instruction from the user within the waiting duration for the voice instruction;
determining a second integrity of a combined instruction composed of the voice instruction of the user and the supplementary voice instruction of the user by using the integrity detection model in response to detecting that the supplementary voice instruction is not a high-frequency instruction; and
determining a waiting duration for the combined instruction based on the second integrity and the preset integrity threshold in response to determining that the second integrity is greater than the first integrity, wherein the waiting duration for the combined instruction indicates a length of period between a time when the voice interaction device determines that receiving the supplementary voice instruction is completed and a time when the voice interaction device performs an operation in response to the combined instruction.

9. The device according to claim 8, wherein the instructions, when executed by the at least one processor, cause the at least one processor further to perform operations of
determining that the waiting duration for the voice instruction is a first waiting duration, in response to the first integrity being greater than or equal to the preset integrity threshold.

10. The device according to claim 8, wherein the instructions, when executed by the at least one processor, cause the at least one processor further to perform operations of:
determining that the waiting duration for the voice instruction is a second waiting duration, in response to the first integrity being less than the preset integrity threshold,
wherein the second waiting duration is greater than the first waiting duration.

11. The device according to claim 8, wherein the instructions, when executed by the at least one processor, cause the at least one processor further to perform operations of:
deleting the waiting duration for the voice instruction; and
determining a waiting duration for the combined instruction based on the second integrity and the preset integrity threshold.

12. The device according to claim 8, wherein the instructions, when executed by the at least one processor, cause the at least one processor further to perform operations of:
determining that the waiting duration for the combined instruction is a first waiting duration in response to the second integrity being greater than or equal to the preset integrity threshold; or
determining that the waiting duration for the combined instruction is a second waiting duration in response to the second integrity being less than the preset integrity threshold,
wherein the second waiting duration is greater than the first waiting duration.

13. The device according to claim 8, wherein the instructions, when executed by the at least one processor, cause the at least one processor further to perform operations of
determining that the waiting duration for the voice instruction or a waiting duration for the supplementary voice instruction is a third waiting duration, in response to detecting that the voice instruction is a high-frequency instruction, and wherein the third waiting duration is less than the first waiting duration; and
responding to the voice instruction from the user or the supplementary voice instruction from the user according to the third waiting duration.

14. An electronic device, comprising:
at least one processor; and
a memory in communication with the at least one processor;
wherein the memory stores instructions executable by the at least one processor, and the instructions, when executed by the at least one processor, cause the at least one processor to perform the method according to claim 7.

15. A non-transitory computer-readable storage medium having computer instructions stored thereon, wherein the computer instructions, when executed, cause a computer to perform the method according to claim 1.

16. A non-transitory computer-readable storage medium having computer instructions stored thereon, wherein the computer instructions, when executed, cause a computer to perform the method according to claim 7.

* * * * *